United States Patent [19]

Shishido et al.

[11] Patent Number: 5,570,202
[45] Date of Patent: Oct. 29, 1996

[54] IMAGE TRANSMISSION APPARATUS IN WHICH PIXEL DATA ARE REARRANGED USING SEQUENCE NUMBERS FOR RESPECTIVE FRAMES

[75] Inventors: Shinji Shishido; Koh Kamizawa, both of Kanagawa, Japan

[73] Assignee: Fuji Xerox Co., Ltd., Tokyo, Japan

[21] Appl. No.: 363,319

[22] Filed: Dec. 23, 1994

[30] Foreign Application Priority Data

Dec. 27, 1993 [JP] Japan .................... 5-331121

[51] Int. Cl.[6] .................... H04M 1/00
[52] U.S. Cl. .................... 358/405; 348/616
[58] Field of Search .................... 358/404, 405, 358/433, 434; 348/616, 617, 336, 340

[56] References Cited

U.S. PATENT DOCUMENTS

| | | | |
|---|---|---|---|
| 4,590,520 | 5/1986 | Frame et al. | 348/616 |
| 4,638,380 | 1/1987 | Wilkinson et al. | 360/22 |
| 4,656,514 | 4/1987 | Wilkinson et al. | 348/616 |
| 4,737,863 | 4/1988 | Eto et al. | 358/334 |
| 5,057,938 | 10/1991 | Edamura | 358/434 |

FOREIGN PATENT DOCUMENTS

| | | |
|---|---|---|
| 0476630 | 3/1992 | European Pat. Off. . |
| 0556816 | 8/1993 | European Pat. Off. . |
| 4239840 | 8/1992 | Japan . |
| WO92/14327 | 8/1992 | WIPO . |

*Primary Examiner*—Edward L. Coles, Sr.
*Assistant Examiner*—Shahreen Ali
*Attorney, Agent, or Firm*—Finnegan, Henderson, Farabow, Garrett & Dunner, L.L.P.

[57] ABSTRACT

The order of pixel data is converted on a frame-by-frame basis to produce a prescribed combination of pixel data. To construct frames, sequence numbers representing the order of the frames are attached to respective frame data each composed of a plurality of pixel data thus produced. The frames thus constructed are transmitted to the transmission line. On the receiving side, the sequence numbers of the frames received from the transmission line are checked to detect a missing frame. Pixel data of the missing frame is replaced by those of a frame having a sequence number immediately before that of the missing frame. An image is reconstructed by inversely converting the order of the pixel data which include the replaced pixel data.

5 Claims, 9 Drawing Sheets

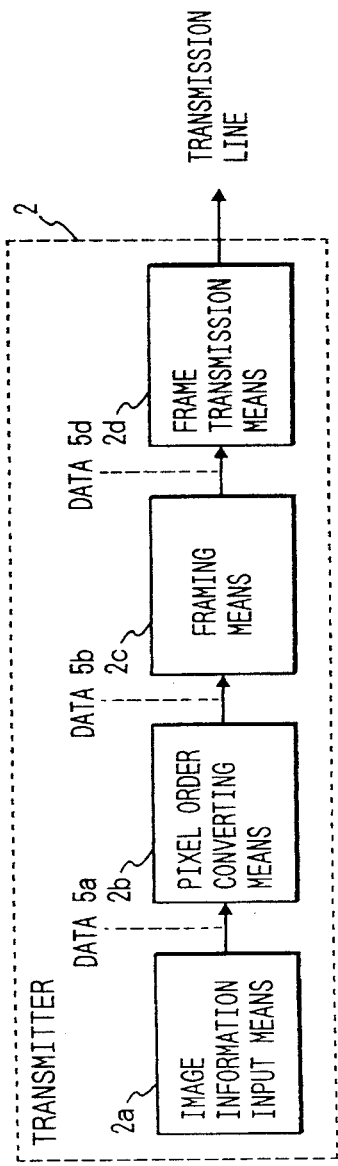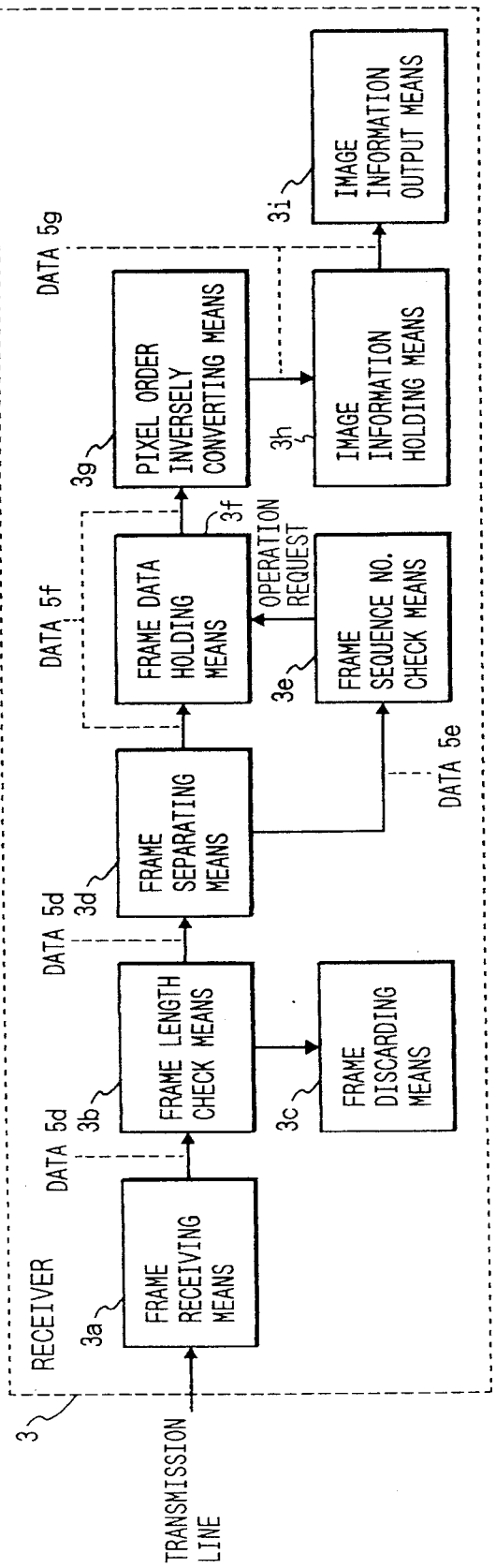

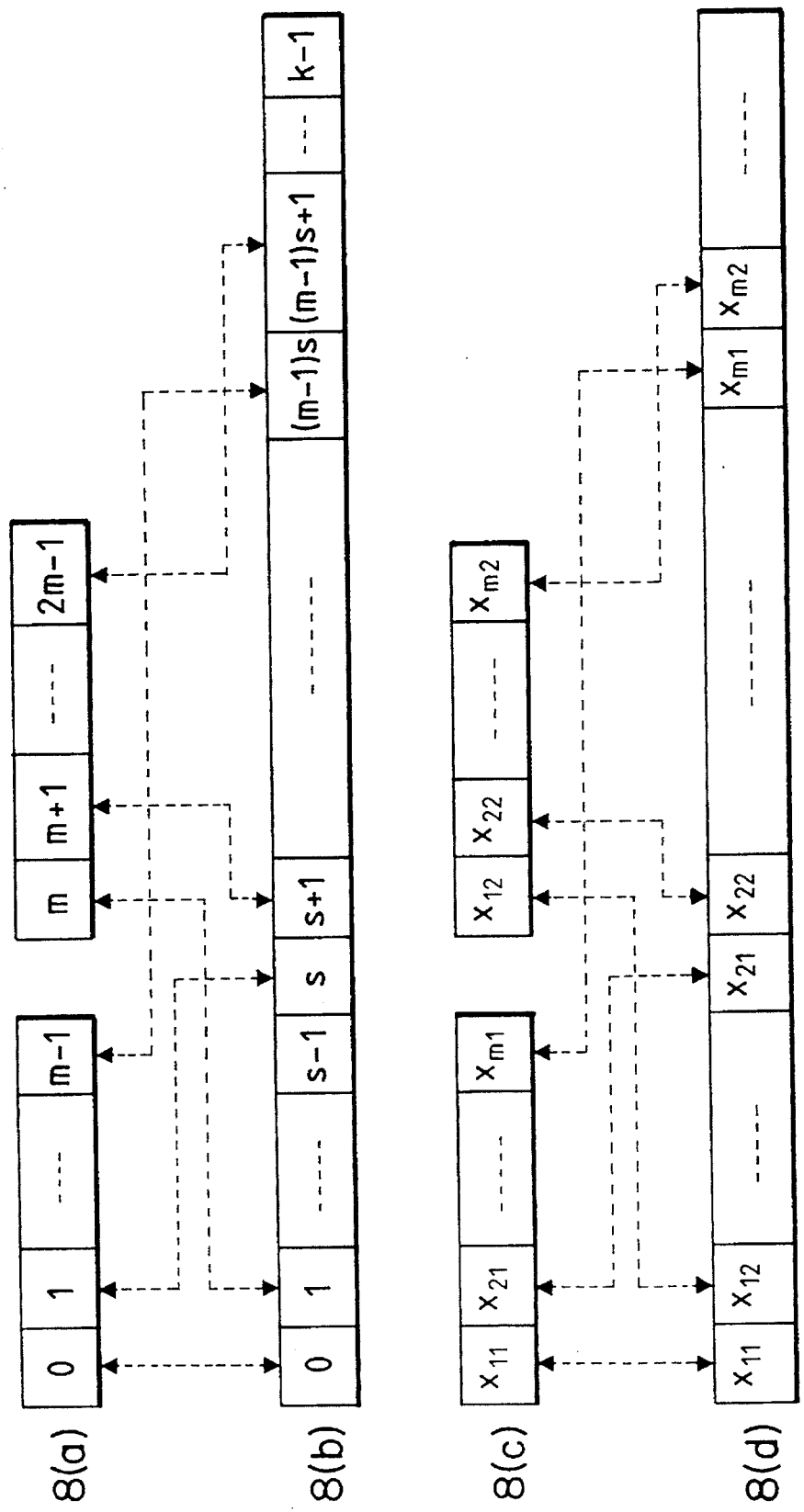
FIG. 8(a-d)

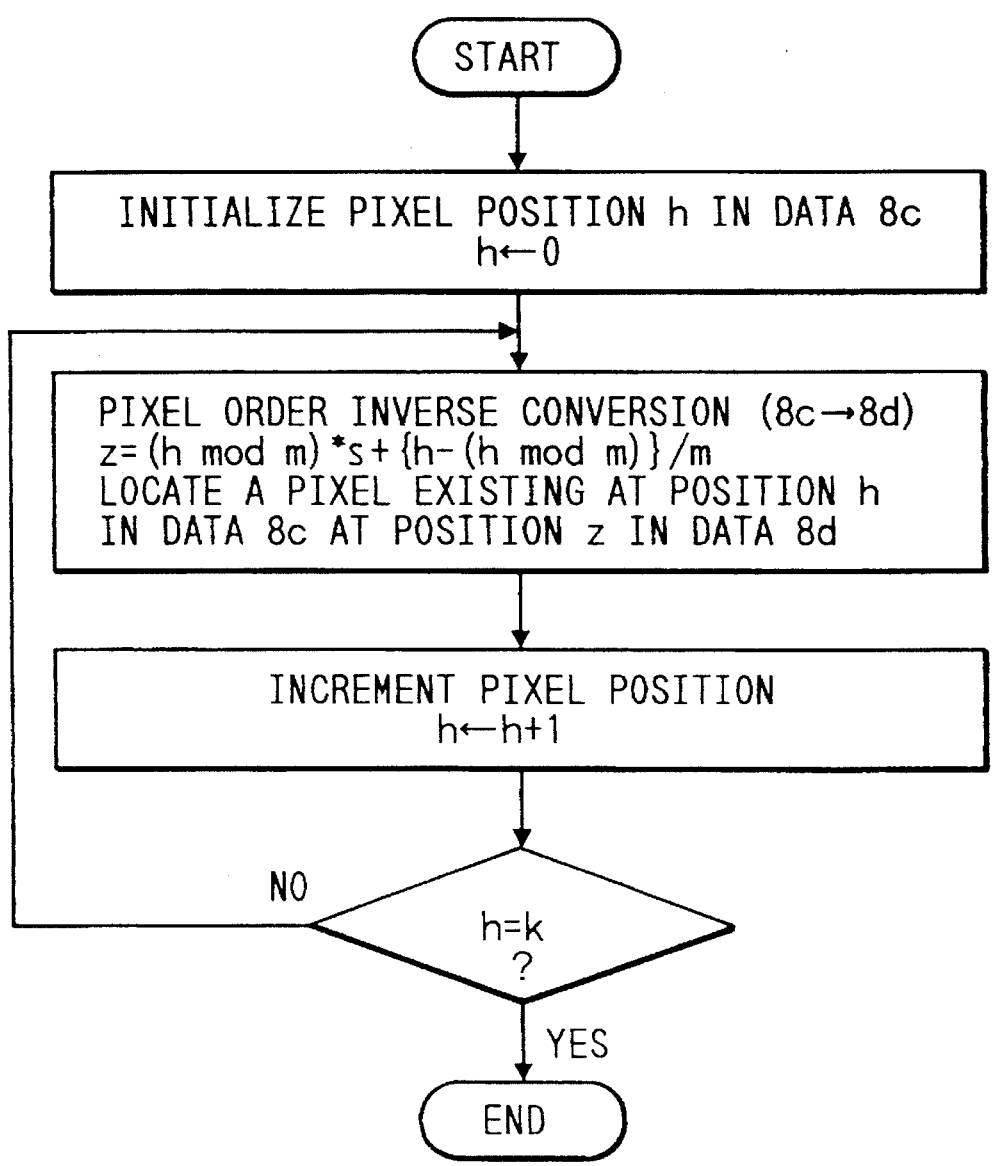

FIG. 10(a-h)  PRIOR ART
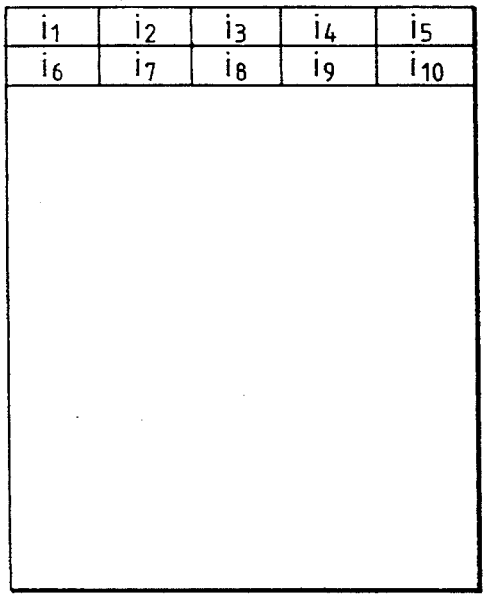
10(a)
10(b)
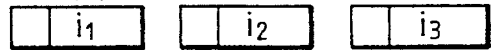
10(c)
— TRANSMISSION CONTROL DATA
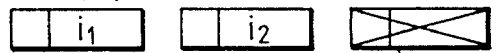
10(d)
— MISSING FRAME
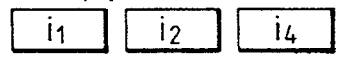
10(e)
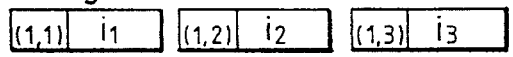
10(g)
10(h)
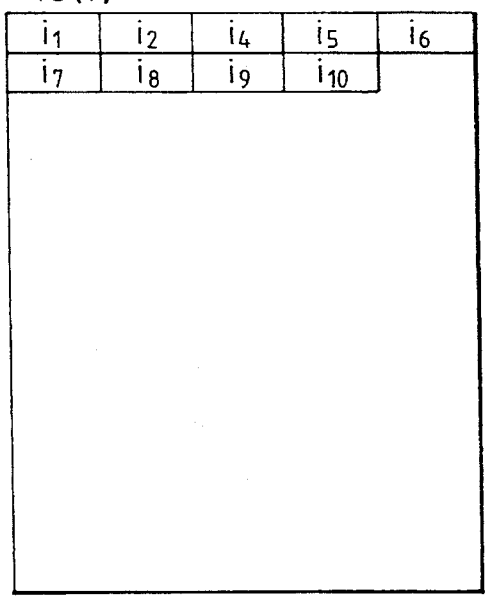
10(f)

IMAGE TRANSMISSION APPARATUS IN WHICH PIXEL DATA ARE REARRANGED USING SEQUENCE NUMBERS FOR RESPECTIVE FRAMES

BACKGROUND OF THE INVENTION

The present invention relates to an image transmission apparatus for transmitting image data and, in particular, to an image transmission apparatus which can prevent deteriorations in image quality even if some transmission data is lost in a transmission line.

Since an image is composed of a number of pixels arranged two-dimensionally, image information is sent through a transmission line in the following manner, on the transmission side, a prescribed number of pixels are picked up from the two-dimensionally arranged pixels and combined with transmission control data, to thereby form a frame. The image information is transmitted on a frame-by-frame basis. On the receiving side, the transmitted pixels are arranged at their original two-dimension positions, to thereby reconstruct the image. In the above image transmission scheme, there may be used a transmission line which has a possibility that some transmission data is lost during transmission. A lack of some transmission data causes adverse influences on the reconstructed image. This will be explained in detail with reference to FIG. 10.

In the case of sending an image as shown in part (a) of FIG. 10 after dividing it into a number of unit images $i_1$, $i_2$, $i_3$, ... each consisting of a prescribed number of pixels (see part (b)), transmission control data is added to the prescribed number of pixels, to form a frame, as shown in part (c). The image information is transmitted on a frame-by-frame basis.

If a frame is lost during transmission as shown in part (d) of FIG. 10, the unit images that should be received in the order of $i_1$, $i_2$, $i_3$, ... are actually received in the order of $i_1$, $i_2$, $i_4$, ... as shown in part (e). As a result, pixel positions deviate as shown in part (f); that is, the original image of part (a) is not reconstructed properly. Some measure is needed against a lack of transmission data.

The following schemes are known as methods for preventing deviations of pixel positions due to a lack of transmission data and enabling proper image reconstruction.

Conventional Scheme 1

For each frame, a response is made to inform the transmission side whether the frame has been correctly received or not. If the frame is found lost, the same frame is transferred again.

Conventional Scheme 2

An address representing a two-dimensional position is added to each set of pixels of a prescribed number. An image is reconstructed by arranging the sets of pixels at the positions represented by the respective addresses (for example, see Japanese Unexamined Patent Publication No. Hei. 4-239840).

Referring to FIG. 10, according to conventional method 1, after transmitting an unit image $i_1$, the transmission side waits for a response from the receiving side indicating whether the unit image $i_1$ has been received correctly or not. When the response indicates correct reception of the unit image $i_1$, the transmission side transmits the next unit image $i_2$. However, when the response indicates that the unit image $i_1$ has not been received correctly, the transmission side again transmits the unit image $i_1$. Repetition of the above operation prevents deviations of pixel positions due to a lack of a frame.

According to conventional method 2, addresses (1, 1), (1, 2), ... representing positions are added to the respective unit images $i_1$, $i_2$, ... as shown in part (g) of FIG. 10, and resulting frames are transmitted. In the receiving side, the unit images $i_1$, $i_2$, ... are arranged at the positions represented by the respective addresses. Therefore, as shown in part (h), the pixel positions do not deviate even if a frame is lost.

As described above, where a transmission line is used in image transmission which line has a possibility that some transmission data is lost during transmission, a certain measure is needed against a lack of image data. However, the conventional schemes have the three problems described below.

Problem (1): In conventional method 1, the effective bandwidth of data transmission is lowered, because a response is made from the receiving side and possibly a missing frame is retransmitted on a frame-by-frame basis.

Problem (2): In conventional method 2, although no response is needed from the receiving side, a missing frame causes a visual interference in which a portion of the received image information becomes ineffective in a concentrated manner as shown in part (h) of FIG. 10.

Problem (3): With regard to problem (2), Japanese Unexamined Patent Publication No. Hei. 4-239840 (mentioned above) proposes a means for avoiding the above visual interference in which when a plurality of blocks each including a prescribed number of pixels are converted to frames, rearrangement is so made that image data of the originally adjacent blocks do not adjoin each other. However, in the proposed means, since each of blocks included in one frame has an address, the effective bandwidth of the image data transmission is lowered. To reduce the quantity of ineffective image data, it is necessary to reduce the block size. However, if the block size is reduced, the number of addresses representing positions of the respective blocks is increased, resulting in a lowered effective bandwidth of the image data transmission.

SUMMARY OF THE INVENTION

An object of the present invention is to provide an image transmission apparatus which can avoid visual interference with a minimum necessary overhead without affecting the effective bandwidth of data transmission.

According to the invention, an image transmission apparatus which receives a plurality of pixel data constituting an image in a unit of a prescribed number of pixels, attaches transmission control data to each frame data including a plurality of pixel data, to form transmission frames which are then transmitted, and reconstructs the image by arranging the pixel data at original two-dimensional positions based on the transmission control data, comprises:

means for attaching sequence numbers to the respective frame data, to form frames each having a fixed number of pixel data;

means for changing an order of the pixel data on a frame-by-frame basis so as to produce a prescribed combination of pixel data, to thereby form transmission frames;

means for transmitting the transmission frames to a transmission line;

means for receiving the transmission frames from the transmission line;

means for detecting a missing frame by checking the sequence numbers of the received frames; and means for replacing pixel data of the missing frame with that of a prescribed received frame.

In the image transmission apparatus of the invention, a frame having a fixed length is formed for each of a prescribed number of pixel data. The order of pixel data is converted on a frame-by-frame basis to provide a prescribed combination of pixel data. Sequence numbers representing the order of the frames are attached to the respective frames. The transmission frames thus constructed are transmitted to the transmission line. On the receiving side, the sequence numbers of the frames received from the transmission line are checked to detect a missing frame. Pixel data of the missing frame are replaced by those of another received frame. As a result, even if a missing frame occurs, the original image can be reconstructed.

BRIEF DESCRIPTION OF THE DRAWINGS

FIG. 1 is a block diagram showing a configuration of a transmitter according an embodiment of to the present invention;

FIG. 2 is a block diagram showing a configuration of a receiver according to the embodiment of the invention;

FIG. 8 is a schematic diagram showing a procedure of inversely converting the order of pixel data;

FIG. 9 is a flowchart showing the procedure of inversely converting the order of pixel data; and FIG. 10 is a schematic diagram illustrating how a lack of data influences an image.

DESCRIPTION OF THE PREFERRED EMBODIMENT

Figure 3:
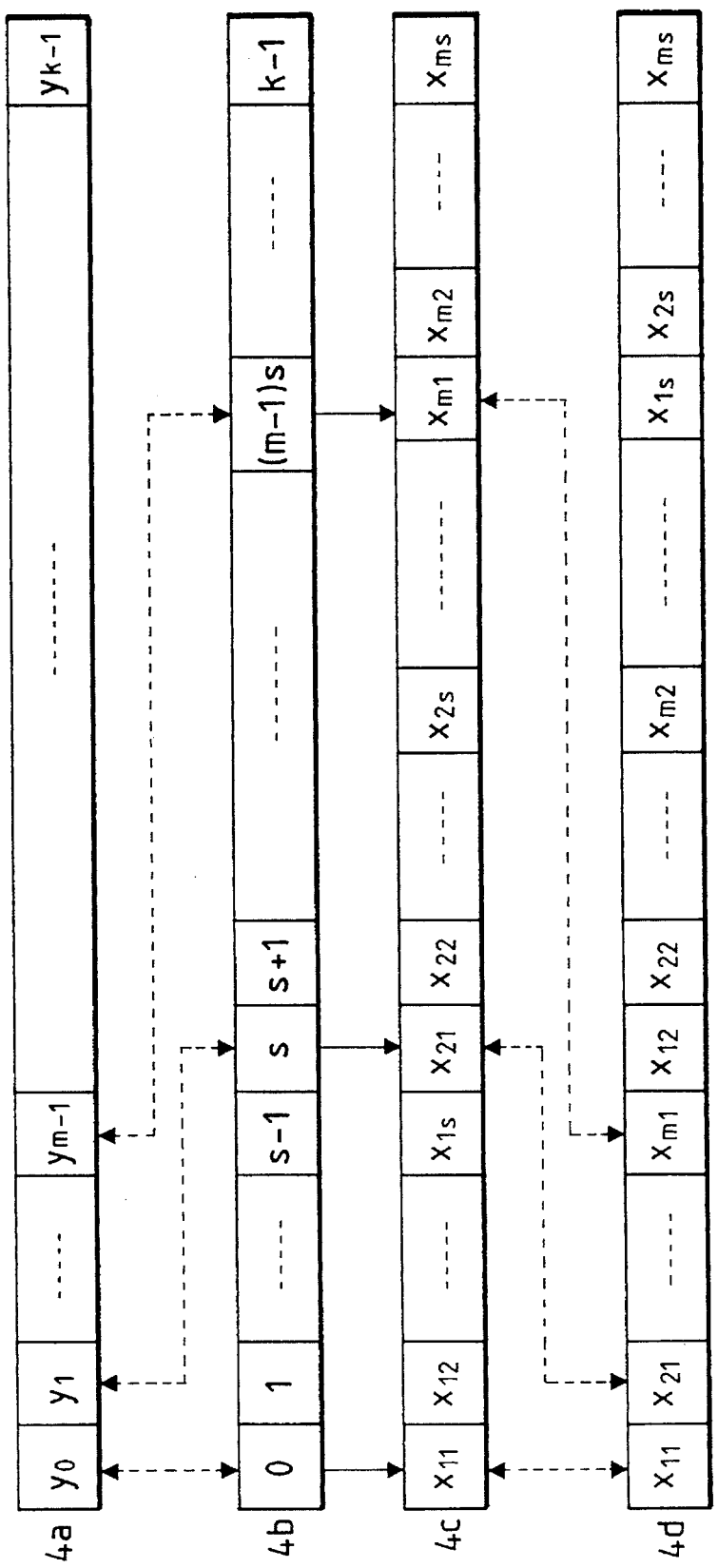
FIG. 3 is a schematic diagram showing a procedure of converting the order of pixel data.

FIG. 1 is a block diagram showing a transmitter employed in an image transmission apparatus according to an embodiment of the present invention. FIG. 2 is a block diagram showing a receiver employed in the image transmission apparatus according to the embodiment of the invention.

Image information is sent from the transmitter of FIG. 1 to the receiver of FIG. 2 through a transmission line which has a possibility that data is lost during transmission.

In this embodiment, there is set a condition that the number k of pixels per line of an image to be transmitted have one or more measures. A number m that is one of the measures of k is fixedly used as the number of pixels of transmission frame data. That is, the length of data of one frame is m (pixels). The number m may be any measure of k. The numbers k and m are referred to as a line length of an image and a frame data length, respectively.

In the following description, with a certain positive integer k, the line length of a transmission image is fixed to k (pixels) and the frame data length is fixed to m (pixels) that is one of measures of k. Since m is one of the measures of k, there exists a positive integer s which satisfies k=sm.

The transmitter 2 shown in FIG. 1 is composed of the following components. An image information input means 2a receives image information as pixel sequences on a line-by-line basis, and outputs a plurality of pixel data that represent at least one line of an image. A pixel order converting means 2b converts the order of the line-unit pixel data to the order of transmission image data. A framing means 2c divides the pixel data into frame data each having the above-mentioned frame data length, and adds sequence numbers (frame numbers) to the respective frame data, to thereby form transmission frames. A frame transmission means 2d transmits the thus-formed transmission frames to a transmission line. Having a frame number assigning means for sequentially assigning individual numbers to a plurality of frames and adding the numbers to the respective frames, the framing means 2c allocates a plurality of pixel data of one line as rearranged by the pixel order converting means 2b to the respective frames based on the frame numbers assigned to the respective frames.

The receiver 3 shown in FIG. 2 is composed of the following components. A frame receiving means 3a receives the transmission frames from the transmission line. A frame length check means 3b measures the frame length of each received frame, and compares the measured frame length with a prescribed frame length. A frame discarding means 3c discards a frame having an erroneous frame length. A frame separating means 3d separates each received frame into a frame sequence number and pixel data. A frame sequence number check means 3e compares the received frame sequence number with an expected number. A frame data holding means 3f holds the received pixel data. A pixel order inversely converting means 3g converts the order of the transmission pixel data to the order of the line-unit pixel data. An image information holding means 3h holds the image information line by line. An image information output means 3i outputs the image information as pixel sequences on a line-by-line basis.

Next, a description will be made of the operations of the transmitter 2 and the receiver 3 with reference to FIGS. 1–9.

First, the operation of the transmitter 2 will be described. Referring to FIG. 1, image information that has been received by the image information input means 2a on a line-by-line basis is forwarded to the pixel order converting means 2b as image information 5a (see FIG. 5).

The pixel order converting means 2b converts the pixel order such that two pixels spaced from each other by an interval s (hereinafter referred to as "stride width") that is a positive integer satisfying k=sm come to adjoin each other. Resulting image information 5b is forwarded to the framing means 2c.

A generalized description will be made of the operation of the pixel order converting means 2b.

It is intended to send an image in the form of s frames in which image each line is composed of k pixels, where k=ms (m≠k). And it is desired that frames made adjacent to each other by the pixel order conversion have corresponding elements that are adjacent to each other (i.e., the distance is 1) in the original image.

An equivalence relation having a modulo s is used to divide k pixels into s sets of pixels. More specifically, natural numbers j=1, 2, . . . , k are divided into s sets such that $$S_0 = \{j | j \bmod s \equiv 0 \ \& \ 1 \leq j \leq k\} \quad (1)$$
$$S_1 = \{j | j \bmod s \equiv 1 \ \& \ 1 \leq j \leq k\}$$
$$S_2 = \{j | j \bmod s \equiv 2 \ \& \ 1 \leq j \leq k\}$$
$$\cdots$$
$$S_{s-1} = \{j | j \bmod s \equiv s - 1 \ \& \ 1 \leq j \leq k\}.$$

A set $S_x$ has m elements of x, x+s, x+2s, ..., x+(m-1)s except for $S_0$ ($S_0=\{s, 2s, 3s, \ldots, ms\}$).

Now, if elements of each of two sets $S_x$ and $S_y$ are arranged in the increasing order, corresponding elements of the two sets have a distance |x−y|.

$S_x=\{x, x+s, x+2s, \ldots x+(m-1)s\}$ $S_y=\{y, y+s, y+2s, \ldots, y+(m-1)s\}$ Corresponding elements are adjacent to each other if $|x-y|=1$.

Assume here that frames are formed by the sets $S_0$–$S_{s-1}$ whose elements are arranged in the increasing order. In this case, if two frames whose suffixes have a difference 1 are adjacent to each other, corresponding elements, i.e., pixels of the two sets, i.e., frames are also adjacent to each other. Therefore, "taking pixels at intervals s" is equivalent to "dividing numbers into sets of numbers (i.e., frames of pixels) which sets are represented by an equivalence relation having a modulo s."

The frames are transmitted from the frame transmission means 2d in the increasing order of the sequence numbers. In the receiving side, the original image is reconstructed by inversely converting the order of pixels.

In a specific example of k=12, s=3 and m=4, frames are obtained as follows:

$$\begin{aligned}
\text{frame 1} &= \{j | j \bmod s \equiv 1 \ \& \ 1 \leq j \leq k\} \\
&= \{1, 1+s, 1+2s, 1+3s\} \\
&= \{1, 4, 7, 10\} \\
\text{frame 2} &= \{j | j \bmod s \equiv 2 \ \& \ 1 \leq j \leq k\} \\
&= \{2, 2+s, 2+2s, 2+3s\} \\
&= \{2, 5, 8, 11\} \\
\text{frame 3} &= \{j | j \bmod s \equiv 3 \ \& \ 1 \leq j \leq k\} \\
&= \{3, 3+s, 3+2s, 3+3s\} \\
&= \{3, 6, 9, 12\}
\end{aligned}$$

It is seen that corresponding pixels (i.e., pixels on the same column) of the adjacent frames are adjacent to each other The sets S0–Ss-1 can also be expressed as $S_\lambda=\{j | \lambda \equiv j (mod \ s) \ \& \ 1 \leq j \leq k\} (0 \leq \lambda < s)$.

In this case, the sequence numbers are defined as numbers to be added, in order, to frames when the frames are constructed by rearranging a prescribed number (k) of pixels (pixels of one line) according to the above definition with the condition that $\lambda$ is in the increasing order. Therefore, while the same set of numbers $\lambda$ are repeatedly used for respective lines of the original image, the different sequence numbers are added to the respective frames.

Figure 4:
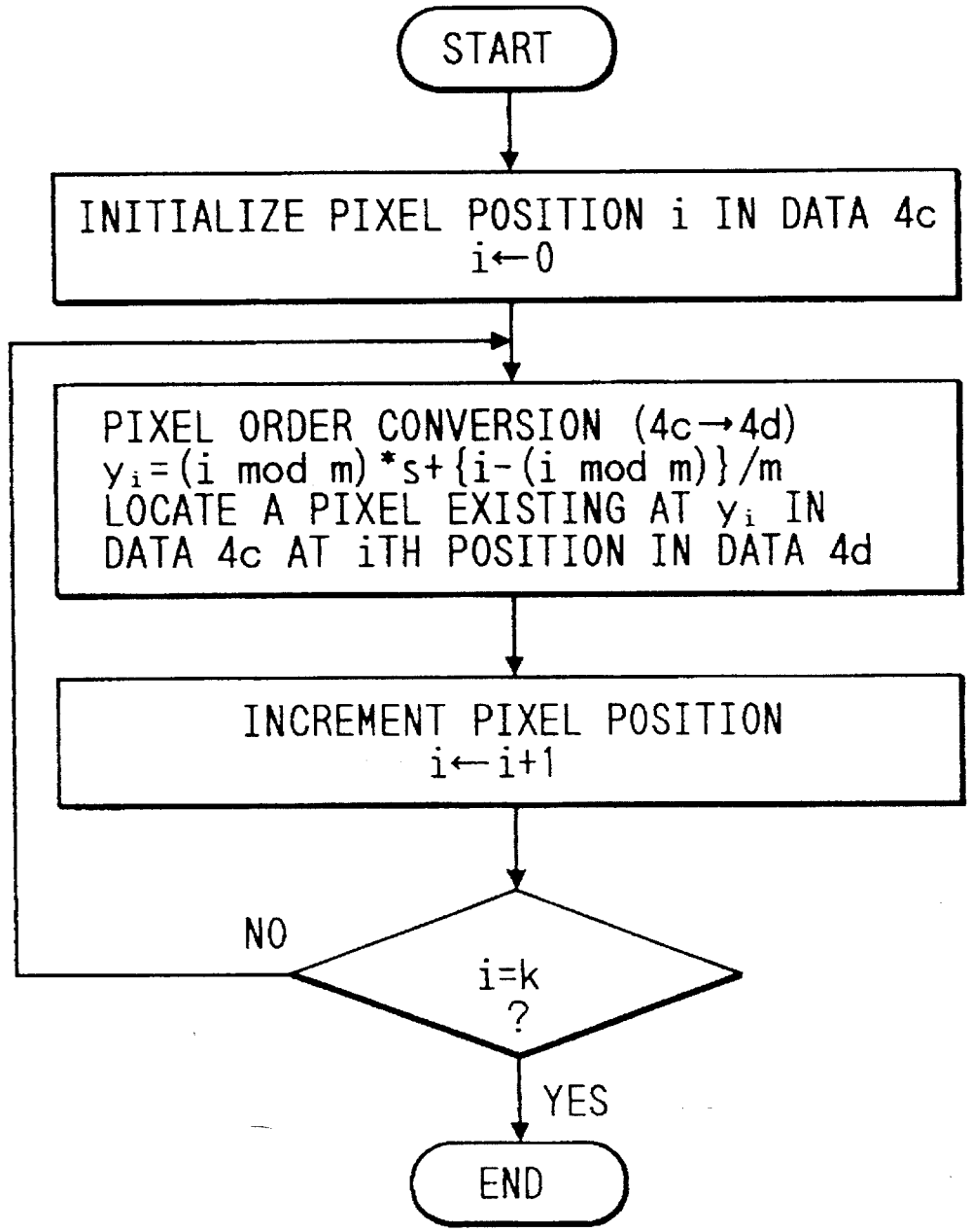
FIG. 4 is a flowchart showing the procedure of converting the order of pixel data.

The procedure of the pixel order conversion is shown in a flowchart of FIG. 4.

Referring now to FIG. 3, symbol 4a denotes positional information after the pixel order conversion; 4b, positional information before the pixel order conversion; 4c, a pixel sequence before the pixel order conversion; and 4d, a pixel sequence after the pixel order conversion. Arrows drawn between the positional information 4a and the positional information 4b indicate correspondence therebetween. Similarly, arrows drawn between the pixel sequence 4c and the pixel sequence 4d indicate correspondence therebetween.

The framing means 2c converts the rearranged image information 5b to image information 5c by dividing the image information 5b into frame data each having the prescribed frame data length m, and attaches sequence numbers 5e to the heads of the respective frame data of the image information 5c.

Transmission frames 5d thus formed are forwarded to the frame transmission means 2d. There may be employed error correction coding, such as CRC, for protection against a bit error in the frame sequence numbers due to a transmission error.

The frame transmission means 2d supplies the transmission frames 5d to the transmission line.

Next, a description will be made of the operation of the receiver 3. Referring to FIG. 2, a transmission frame 5d is received by the frame receiving means 3a, and then forwarded to the frame length check means 3b.

The frame length check means 3b measures the frame length of the transmission frame received, and compares the measured frame length with a prescribed frame length. If they identical with each other, the check means 3b forwards the transmission frame 5d to the frame separating means 3d. If they are not identical with each other, the check means 3b forwards the transmission frame 5d to the frame discarding means 3c.

The frame discarding means 3c discards a frame the length of which is not identical with the prescribed frame length. The frame separating means 3d separates the transmission frame 5d into the frame sequence number 5e and the frame data 5f, and forwards the frame sequence number 5e and the frame data 5f to the frame sequence number check means 3e and the frame data holding means 3f, respectively. Having a buffer in which frame data serves as a unit of read and write operations, the frame data holding means 3f stores the received frame data. While the buffer of the present embodiment is one having a storage capacity of two frame data, there may be employed a buffer having a storage capacity of three or more frame data.

The frame sequence number check means 3e judges whether the sequence number 5e coincides with an expected number. If the judgment is affirmative, the check means 3e supplies a frame sequence number coincidence operation request to the frame data holding means 3f. If the judgment is negative, the check means 3e supplies a frame sequence number non-coincidence operation request to the frame data holding means 3f.

Figure 6:
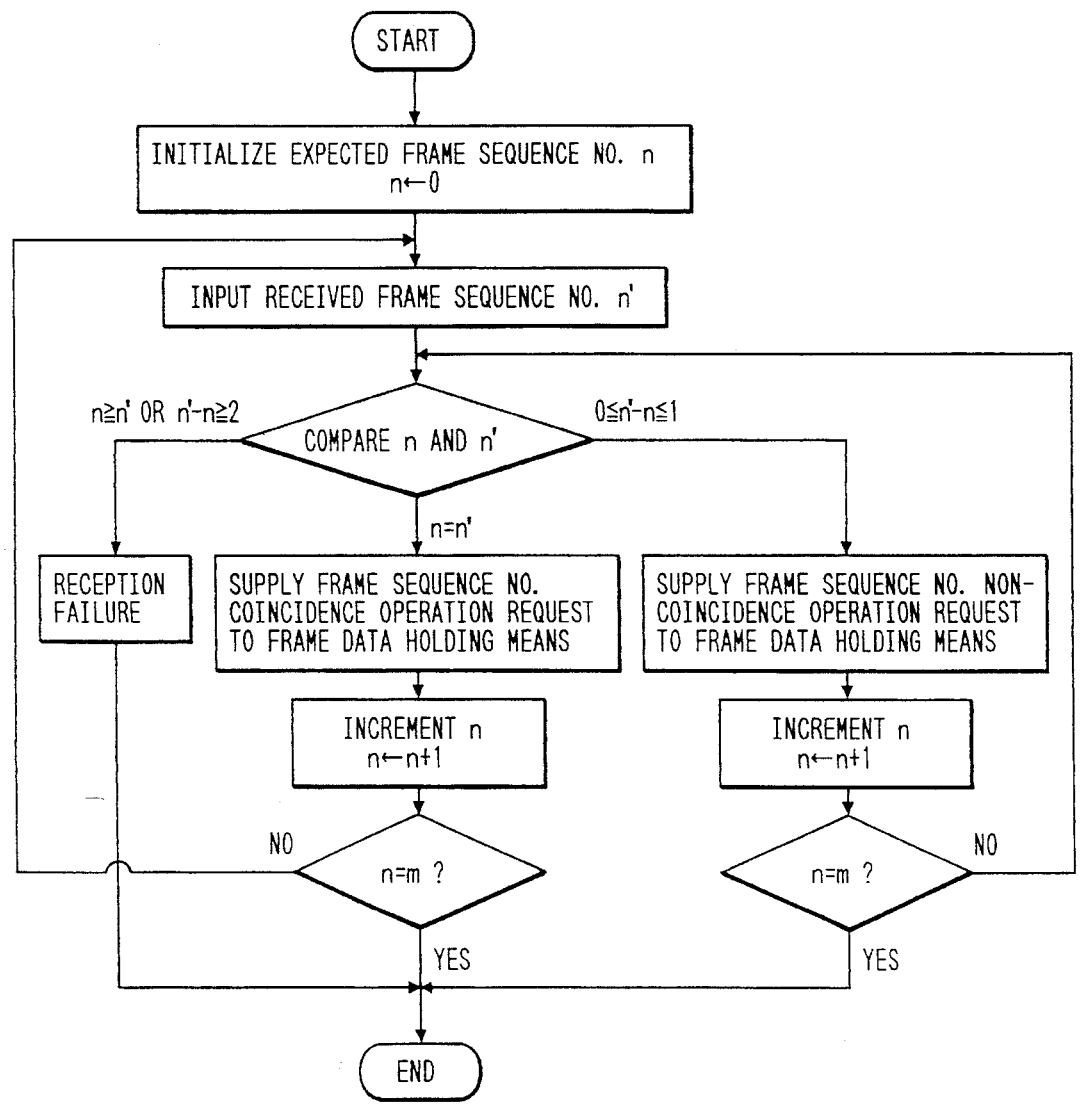
FIG. 6 is a flowchart showing a procedure of checking sequence numbers.

The procedure of checking the frame sequence number is performed according to a flowchart shown in FIG. 6. In this embodiment, since it is assumed that the buffer of the frame data holding means 3f has a storage capacity of two frame data, $0 \leq n'-n \leq 1$ and $n'-n \geq 2$ are used as branching conditions of a comparison between the expected frame sequence number n and the received frame sequence number n'. In a general case where a buffer having a storage capacity of r frame data is used, the branching conditions are $0 \leq n'-n \leq r-1$ and $n'-n \geq r$. Since the transmission frames are sent in the order of the frame sequence numbers, there is no possibility that the received frame sequence number n' is smaller than the expected frame sequence number n. When data larger then the buffer data length is lost, or when the received frame sequence number n' is smaller than the expected frame sequence number n, the receiving operation is suspended.

Upon receiving an operation request signal, the frame data holding means 3f forwards the data 5f of the prescribed frame length being stored therein to the pixel order inversely converting means 3g.

Figure 7:
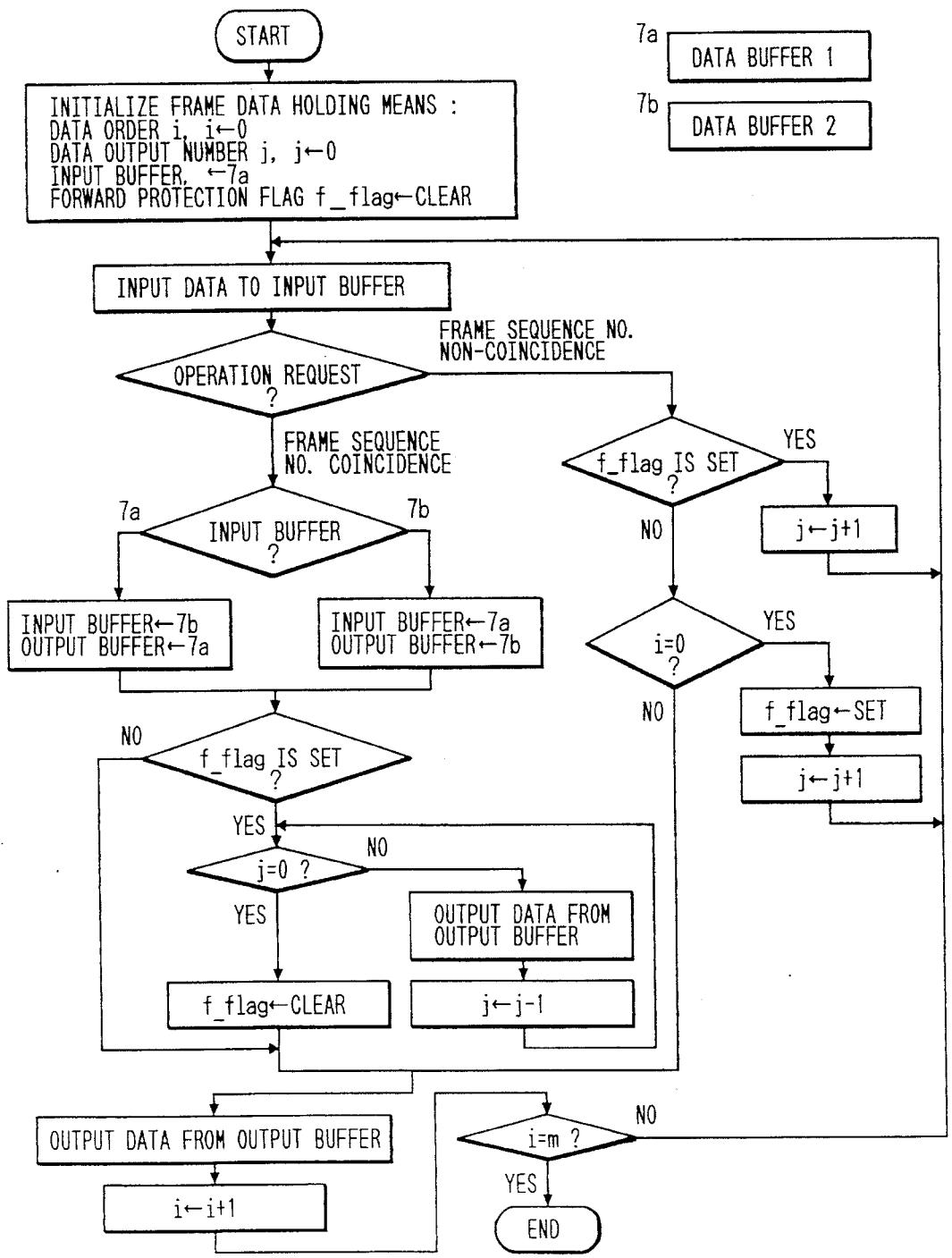
FIG. 7 is a flow chart showing a procedure of replacing frame data of a missing frame in a frame data holding means.

The frame data holding means 3f operates according to a flowchart shown in FIG. 7. The pixel order inversely converting means 3g performs an operation that is reverse to the pixel order converting operation of the pixel order converting means 2b, and locates the image information at proper locations of the image information holding means 3h, to thereby form image data 5g.

FIG. 8 is a schematic diagram showing the procedure of inversely converting the pixel order of the received data according to the invention. FIG. 9 is a flowchart also showing the pixel order inversely converting procedure.

When data of one line are accumulated in the image information holding means 3h as the image data 5g, those data are forwarded to the image information output means 3i as one-line data, and the image information output means 3i outputs one-line image information.

Figure 5:
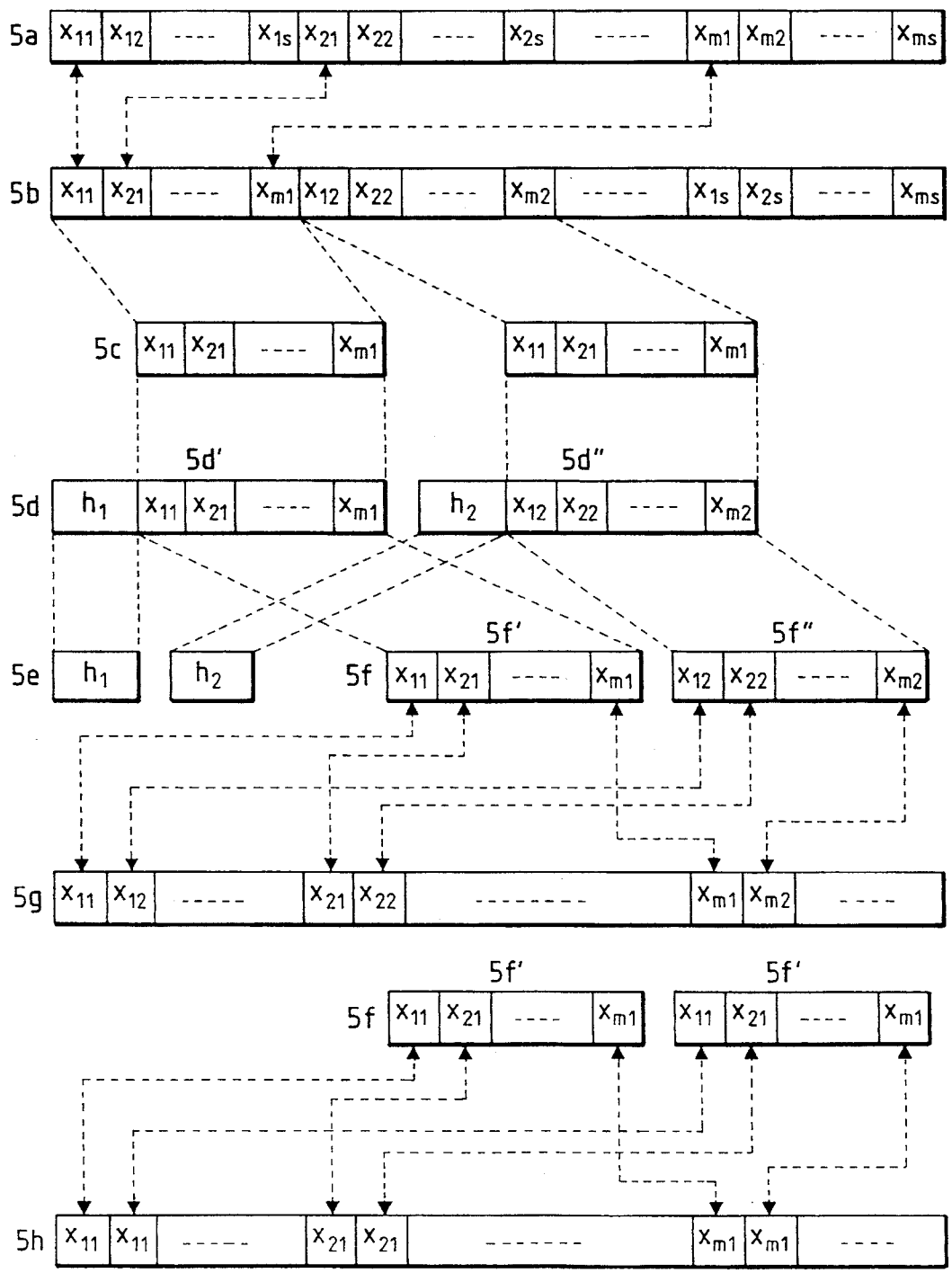
FIG. 5 is a schematic diagram showing data structures in the image transmission apparatus of the invention.

According to the above-mentioned processing, when the transmission frames 5d, i.e., frames 5d' and 5d" are sent in this order, and frame 5d' is received successfully but frame 5d" is lost due to a transmission error in the transmission line, data 5f of frame 5d' received immediately before the missing data 5f" fills the position of the missing data 5f" (see FIG. 5). As a result, in the output image data 5h, the respective pixels of the missing data 5f" are replaced by their adjacent pixels. In general, adjacent pixels have a strong correlation in density. Therefore, even if the missing pixels are replaced by their adjacent pixels, a resulting density variation will not be conspicuous, that is, a resulting image will be natural.

Frame data of the missing frame is replaced by that of a frame of the same line having a sequence number close to that of the missing frame, for instance, a frame having a sequence number immediately before that of the missing frame. The pixel data inversely converting means 3g can reconstruct the original image (stated more strictly, an image slightly different from the original image by the replaced frame data) by rearranging the pixels in the manner reverse to the conversion of Equation (1) using the sequence numbers and the frame data of the replaced frame and the received frames. If the first frame of a certain line is a missing frame, it is preferable that frame data of the first frame is replaced by that of the second frame of the same line. If the last frame of a certain line is a missing frame, it is preferable that frame data of the last frame is replaced by that of the second last frame of the same line.

As described above, the invention does not require a response from the receiving side in addition to the image data transmission, which is in contrast to conventional scheme 1. Since there do not occur delays due to the response from the receiving side and the frame retransmission, the transmission efficiency is not lowered.

Further, unlike conventional scheme 2, the invention does not require that extra control information be included in the image information band. Therefore, the visual interference can be reduced without affecting the effective transmission bandwidth.

Although the image information is input and output on a line-by-line basis in the above embodiment, the invention is not limited to this case, but a plurality of lines may be a unit of the image information input and output operations.

According to the invention, the following advantages are obtained:

(1) Since no response is made from the receiving side with respect to the reception of the transmission data, the effective transmission bandwidth is not lowered.

(2) Since the stride width is determined from the frame data length, the error control can be automatically synchronized by the pixel position synchronization. Therefore, a mechanism for synchronizing the error control is not necessary.

(3) Since the image transmission is performed after the pixel position conversion is carried out with the stride width determined from the frame data length, the visual interference on the image due to missing data can be avoided by simple replacement of frame data.

(4) In the pixel order converting means, the pixel order is converted so that any two pixels belonging to arbitrarily selected two respective frames and located at the same position in each frame have a fixed distance in the image. Even if a frame is lost during transmission, the original image is reconstructed such that frame data of a missing frame is replaced by that of a frame having a sequence number close to that of the missing frame. Since missing pixels are replaced by pixels near the missing pixels in the original image, the replacement of missing frames can provide an image that is almost free of visual interference.

In summary, according to the invention, there can be obtained with a simple structure the image transmission apparatus which, even when using a transmission line in which data may be lost due to a transmission error, can avoid visual interference on an image due to the missing data.

What is claimed is:

1. An image transmission apparatus which receives a plurality of pixel data constituting an image in a unit of a prescribed number of pixels, attaches transmission control data to each frame data including a plurality of pixel data, to form transmission frames which are then transmitted, and reconstructs the image by arranging the pixel data at original two-dimensional positions based on the transmission control data, said image transmission apparatus comprising:

means for attaching sequence numbers to the respective frame data, to form frames each having a fixed length;

means for changing an order of the pixel data on a frame-by-frame basis so as to produce a prescribed combination of pixel data, to thereby form transmission frames;

means for transmitting the transmission frames to a transmission line;

means for receiving the transmission frames from the transmission line;

means for detecting a missing frame by checking the sequence numbers of the received frames; and means for replacing pixel data of the missing frame with that of a prescribed received frame.

2. An image transmission apparatus for sending a plurality of frames each including a plurality of pixel data, comprising:

image information input means for producing a first plurality of pixel data representing at least one line of an image;

frame number assigning means for assigning and attaching sequence numbers to respective frames;

pixel order converting means for changing an order of the first plurality of pixel data produced by the image input means so that a second plurality of pixel data constituting each frame are arranged in an order of appearance in the image, and that any pair of pixel data respectively belonging to arbitrary two frames of the same line and located at the same position in the arbitrary two frames have a fixed distance in the image;

framing means for producing a plurality of transmission frames each having a fixed length by distributing the first plurality of order-changed pixel data of one line to the respective frames based on the sequence numbers assigned to the respective frames;

means for transmitting the transmission frames to a transmission line;

means for receiving the transmission frames from the transmission line;

means for detecting a missing frame by checking the sequence numbers of the received frames;

means for replacing pixel data of the missing frame with that of a received frame having a sequence number close to that of the missing frame; and means for reconstructing the image based on the sequence numbers and the pixel data of successfully received frames and the replaced frame.

3. The image transmission apparatus of claim 2, wherein when an image in which one line includes k pixel data is sent using s frames each including m pixel data, the pixel data of the respective frames are represented by elements of s sets $S_0$–$S_{s-1}$ that satisfy $$S_0 = \{j | j \bmod s \equiv 0 \ \& \ 1 \leq j \leq k\}$$
$$S_1 = \{j | j \bmod s \equiv 1 \ \& \ 1 \leq j \leq k\}$$
$$S_2 = \{j | j \bmod s \equiv 2 \ \& \ 1 \leq j \leq k\}$$
$$\ldots$$
$$S_{s-1} = \{j | j \bmod s \equiv s - 1 \ \& \ 1 \leq j \leq k\}$$

where j is a natural number, and in each frame the m pixel data are arranged in an order in which they appear in the image.

4. The image transmission apparatus of claim 2, wherein the replacing means replaces the pixel data of the missing frame with that of a frame having a sequence number immediately before that of the missing frame.

5. The image transmission apparatus of claim 2, wherein the replacing means replaces the pixel data of the missing frame with that of a frame having a sequence number immediately after that of the missing frame.

* * * * *